United States Patent
Gan

(10) Patent No.: US 9,054,865 B2
(45) Date of Patent: Jun. 9, 2015

(54) CRYPTOGRAPHIC SYSTEM AND METHODOLOGY FOR SECURING SOFTWARE CRYPTOGRAPHY

(71) Applicant: V-Key Inc., Grand Cayman (KY)

(72) Inventor: Joseph Cher Chuen Gan, Singapore (SG)

(73) Assignee: V-Key, Inc., Grand Cayman (KY)

( * ) Notice: Subject to any disclaimer, the term of this patent is extended or adjusted under 35 U.S.C. 154(b) by 0 days.

(21) Appl. No.: 13/980,917

(22) PCT Filed: Nov. 16, 2012

(86) PCT No.: PCT/SG2012/000429
§ 371 (c)(1),
(2) Date: Jul. 22, 2013

(87) PCT Pub. No.: WO2013/074041
PCT Pub. Date: May 23, 2013

(65) Prior Publication Data
US 2014/0289535 A1    Sep. 25, 2014

Related U.S. Application Data

(60) Provisional application No. 61/645,985, filed on May 11, 2012.

(30) Foreign Application Priority Data

Nov. 16, 2011    (SG) ................ 201108491-0

(51) Int. Cl.
*G06F 11/30* (2006.01)
*H04L 9/14* (2006.01)
*G06F 21/53* (2013.01)
*H04L 9/32* (2006.01)

(52) U.S. Cl.
CPC ........ *H04L 9/14* (2013.01); *G06F 21/53* (2013.01); *H04L 9/32* (2013.01); *H04L 2209/24* (2013.01)

(58) Field of Classification Search
USPC ....................................... 713/189
See application file for complete search history.

(56) References Cited

U.S. PATENT DOCUMENTS

| | | | |
|---|---|---|---|
| 4,168,396 A | 9/1979 | Best | |
| 4,352,952 A | 10/1982 | Boone et al. | |
| 6,668,325 B1 * | 12/2003 | Collberg et al. | 713/194 |
| 7,409,719 B2 | 8/2008 | Armstrong et al. | |
| 7,516,331 B2 | 4/2009 | Jin et al. | |
| 7,908,653 B2 * | 3/2011 | Brickell et al. | 726/22 |
| 8,560,709 B1 * | 10/2013 | Shokhor et al. | 709/229 |
| 2003/0061497 A1 * | 3/2003 | Zimmer | 713/189 |

(Continued)

OTHER PUBLICATIONS

Garfinkel, et al., "Terra: A Virtual Machine-Based Platform for Trusted Computing," ACM SOSP 03, Oct. 19-22, 2003, pp. 193-206 (14 pages).

(Continued)

*Primary Examiner* — Amare F Tabor
(74) *Attorney, Agent, or Firm* — McCarter & English, LLP

(57) ABSTRACT

A cryptosystem having a secure Cryptographic Virtual Machine (CVM) protected by a Tamper-Proof Virtual Layer (TPVL) for performing cryptography in software is described. The CVM and TPVL allow software applications to store and process cryptographic keys and data in a secure and tamper-proof manner, without requiring the use of a Hardware Security Module (HSM).

19 Claims, 4 Drawing Sheets

Figure 2

(56) References Cited

U.S. PATENT DOCUMENTS

| | | | |
|---|---|---|---|
| 2005/0114683 | A1 | 5/2005 | Jin et al. |
| 2005/0257243 | A1 | 11/2005 | Baker |
| 2006/0136720 | A1 | 6/2006 | Armstrong et al. |
| 2007/0189526 | A1* | 8/2007 | Davidson .................. 380/44 |
| 2010/0199104 | A1 | 8/2010 | Van Rijnswou |
| 2011/0173607 | A1* | 7/2011 | Murphey et al. ............. 718/1 |

OTHER PUBLICATIONS

International Search Report of the International Searching Authority mailed on Mar. 28, 2013, issued in connection with International Application No. PCT/SG2012/000429 (4 pages).

Written Opinion mailed on Mar. 28, 2013, issued in connection with International Application No. PCT/SG2012/000429 (3 pages).

* cited by examiner

US 9,054,865 B2

CRYPTOGRAPHIC SYSTEM AND METHODOLOGY FOR SECURING SOFTWARE CRYPTOGRAPHY

RELATED APPLICATIONS

This application is a U.S. National Phase Application under 35 U.S.C. 371 of International Application No. PCT/SG2012/000429 filed Nov. 16, 2012, which was published on May 23, 2013 under International Publication Number WO 2013/074041 A1, which claims the benefit of Singapore Patent Application No. 201108491-0 filed on Nov. 16, 2011, and U.S. Provisional Patent Application No. 61/645,985 filed on May 11, 2012. The disclosures of these applications are incorporated herein by reference in their entirety.

TECHNICAL FIELD

The present application relates generally to cryptographic systems and, more particularly, to methods for securing such systems when implemented in software.

BACKGROUND OF THE INVENTION

The usage of mobile devices, including both mobile phones and tablet computers, for network communications as well as for the storage and processing of personal information is rapidly growing. Cryptography forms the basis for securing users' sensitive information as they are transmitted between or stored on such devices.

Currently, there are two broad approaches to securing user information on such devices. Conventionally, Hardware Security Modules (HSMs) that provide for secure, tamper-proof containers for cryptographic processing perform these operations in hardware, isolated from software applications. The first documented HSM was described in U.S. Pat. No. 4,168,396, Sep. 18, 1979, and was designed for copy protection of personal computer software. This concept was later extended to a hardware module providing data security (U.S. Pat. No. 4,352,952, Mar. 3, 1980). Examples of present HSMs include "smart cards" built into both contact cards (ISO/IEC 7810 and 7816 standards) as well as contactless cards (ISO/IEC 14443 standard).

In mobile phones and other computing devices, such HSMs are typically not present or not accessible to software applications, and cryptography is performed within the host operating system, isolated using operating system mechanisms. However, an attacker or hacker who has gained access to the operating system has many techniques available to overcome these mechanisms, and therefore gain access to the user's information.

Virtual machines have been used as a means to separate execution between a host computing device, and guest operating system within the virtual machine. This has been used for security in order to enforce security policies (US Patent 2005/0257243, Dec. 29, 2005), to prevent a compromised guest operating system from being able to affect the host (U.S. Pat. No. 7,409,719, Dec. 21, 2004), and to allow only trusted media player applications to access encrypted media on DVDs (U.S. Pat. No. 7,516,331, Nov. 26, 2003). However, none of these attempts to protect the information within the virtual machine when executed on an open software platform such as a mobile phone or desktop operating system.

Based on the above and foregoing, it can be appreciated that there is a need for a cryptosystem having methodology for securing software cryptography from an unauthorised observer or attacker who has gained access to the operating system of a computing device, particularly when the computing device does not have the means to secure cryptographic information in a separate Hardware Security Module. The present invention fulfils this and other needs in the art.

SUMMARY OF THE INVENTION

A cryptographic system and methodology constructed in accordance with the present invention comprises a secure software sandbox operating as a cryptographic sandbox, with a tamper-proof virtual layer surrounding the sandbox to protect the sandbox from reverse engineering, debugging, or tampering. A plurality of applications may communicate with the sandbox to request for cryptographic operations to be performed, and to retrieve the results of the cryptographic operations from the sandbox.

DETAILED DESCRIPTION OF A PREFERRED EMBODIMENT

The following description will focus on an embodiment in accordance with the present invention, which is typically operative in an environment providing application software running under Apple iPhone® or Google Android® operating systems. However, embodiments in accordance with this invention are not limited to any one particular application or any particular environment. Indeed, those skilled in the art will find that the systems and methods of the present invention may be advantageously applied to a variety of system and application software, including security tokens, software cryptography, and network encryption. Moreover, embodiments in accordance with the present invention may be performed in a variety of different platforms, including other mobile phone operating systems such as RIM Blackberry®, Microsoft® Windows Phone, and the like, other operating systems such as Apple Mac OS®, Microsoft® Windows, UNIX, and other operating environments such as web browsers and embedded devices, and the like. Therefore, the description of the shown embodiment in accordance with the present invention that follows is for purposes of illustration and not limitation.

Figure 1:
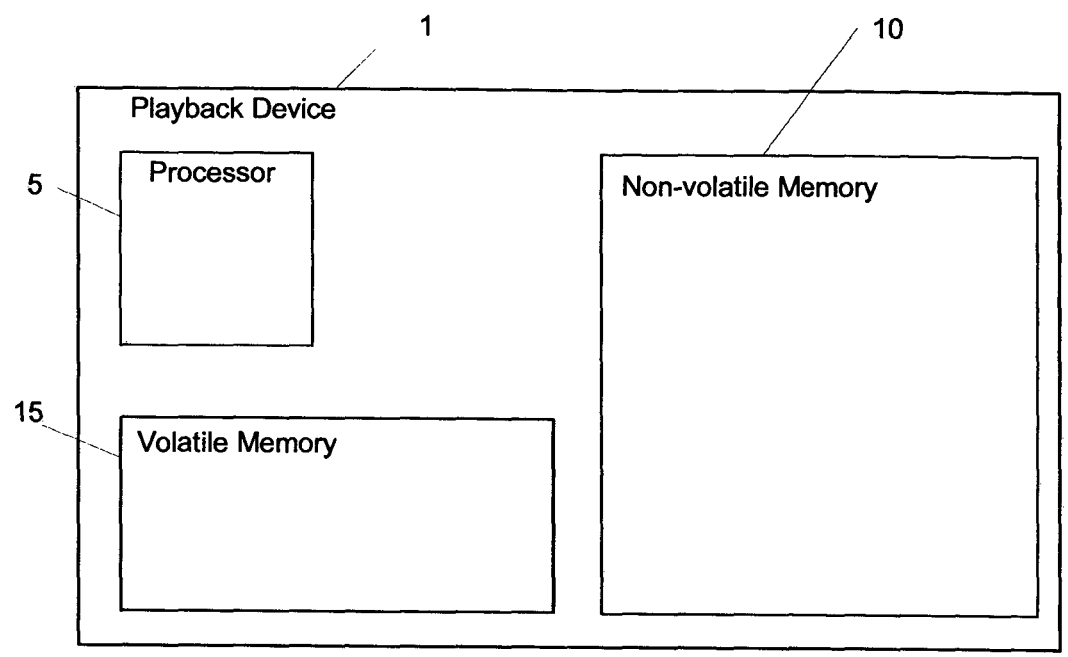
FIG. 1 illustrates a block diagram of the processing system of a device performing systems and methods in accordance with an embodiment of this invention.

The processes for providing methods and systems in accordance with this invention are executed by a device, such as, but not limited to a mobile telephone, tablet, netbook, laptop, or other processing system. The relevant components in a device that perform the processes in accordance with an embodiment of the invention are shown in FIG. 1. One skilled in the art will recognize that the device may include other components that are omitted for brevity without departing from this invention. The device 1 includes a processor 5, a non-volatile memory 10, and a volatile memory 15. The processor 5 is a processor, microprocessor, controller, or a combination of processors, microprocessor, and/or controllers that performs instructions stored in the volatile memory 15 or non-volatile memory 10 to manipulate data stored in the memory. The non-volatile memory 10 can store the processor instructions utilized to configure the processor 5 to perform processes including processes in accordance with embodiments of the invention and/or data for the processes being utilized. In other embodiments, the device software and/or firmware can be stored in any of a variety of computer readable media appropriate to a specific application. Although a specific device is illustrated in FIG. 1, any of a variety of devices configured to store encrypted cryptographic data and perform cryptographic operations can be utilized in accordance with embodiments of the invention.

Figure 2:
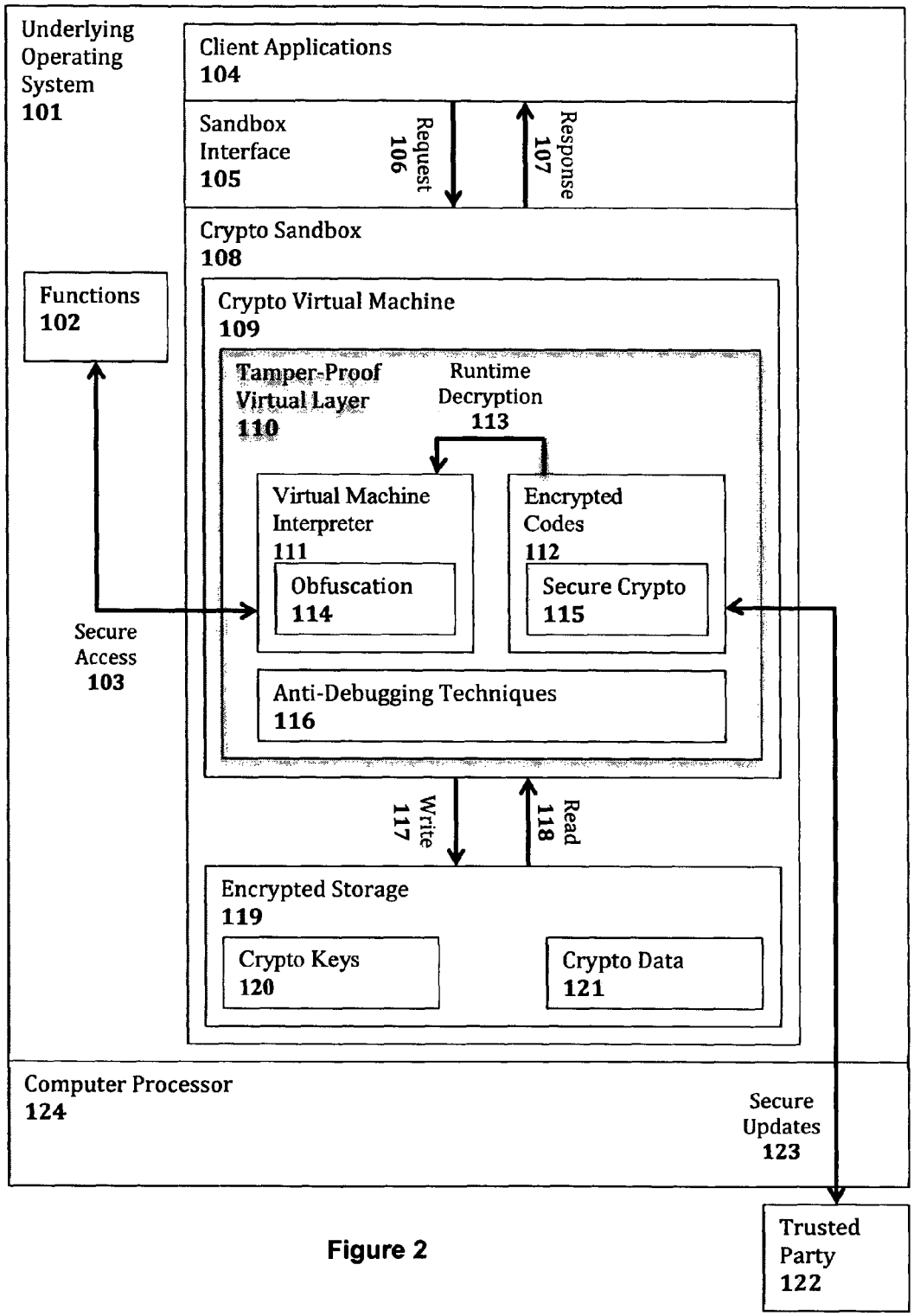
FIG. 2 illustrates a block diagram of components of the cryptographic system in accordance with an embodiment of this invention.

A cryptographic system and methodology constructed in accordance with an embodiment of the present invention is provided as shown in FIG. 2. In the described embodiment, a cryptographic sandbox 108 provides a method for securely storing and processing cryptographic keys and data for a plurality of client applications 104, with a tamper-proof virtual layer 110 within the sandbox to protect the processing and data from unauthorised observers. The cryptographic sandbox 108 may comprise both a secure virtual processor 109 as well as a secure virtual storage 119 in order to allow the client applications 104 to both perform secure processing as well as secure storage.

The cryptographic sandbox 108 may include a cryptographic virtual machine 109 to act as the secure virtual processor. The cryptographic virtual machine may include a secure cryptographic module 115 to perform cryptographic operations, including storing, retrieving, and processing the cryptographic keys and data. These cryptographic operations may include publicly available cryptographic routines, including symmetric key cryptography such as AES, asymmetric key cryptographic such as RSA, hashing functions such as SHA-1, SHA-2, and HMAC, as well as pseudo-random number generation and key generation functions. This virtual machine may receive requests 106 from a plurality of client applications to perform these cryptographic operations by securely processing these cryptographic operations within the virtual machine and sending the results of these cryptographic operations as a response 107 back to the clients. This virtual machine may also be used to perform other non-cryptographic but security-critical processing functions.

The virtual machine 109 may comprise a virtual machine interpreter 111 and a set of virtual machine codes 112. These virtual machine codes may be based on a 32-bit RISC instruction set architecture built solely for the purpose of execution within the virtual machine interpreter. This instruction set architecture may include Assembly instructions required for a general purpose computer processor, including instructions for memory handling, function calling, results comparison, binary arithmetic, and integer arithmetic. The virtual machine and underlying operating system 101 may be executed on a computer processor 124. This computer processor may comprise a general-purpose central processing unit within a mobile phone. The underlying operating system may comprise a mobile phone operating system. The virtual machine interpreter may further include obfuscation techniques 114 to obscure its operations from the underlying operating system and any unauthorised observers therein. These obfuscation techniques may include a technique to dynamically change the execution flow in response to changes in the underlying operating system. This technique may involve a system function callback handler passed to the virtual machine in order for the virtual machine to execute functions from the underlying operating system and detect whether these changes have occurred. The system function callback handler may provide access from the virtual machine to the underlying operating system's file system, processes, and memory. The system function callback handler may provide access to system fingerprinting functions such as retrieving of device identifiers in the underlying operating system. The virtual machine will then determine based on the changes, if any, what the new execution flow should be.

The virtual machine may provide a means for secure encrypted storage 119 of cryptographic keys and data within the virtual machine. The secure storage may additionally be used to store other non-cryptographic but security-critical data. This means may be provided by writing 117 to and reading 118 from the encrypted storage. This encrypted file may be stored within the operating system's file system or within a trusted storage provided by the operating system. The file may be encrypted by the virtual machine using a symmetric block cipher such as AES using an AES key. This AES key may be based on a secret key known only to the virtual machine. This AES key may be based on a password entered by the user through the client application. This AES key may be generated based on hardware and software identifiers extracted from the underlying device. This AES key may be generated based on a response from a remote server.

The client applications may send the request to the virtual machine and receive the results of the cryptographic operations from the virtual machine through a sandbox interface 105. The interface may comprise either a programming interface such as a software library or a network interface such as a TCP/IP network connection. This interface may comprise a set of program function calls for the client applications to perform cryptographic or security-critical functions within the virtual machine. These function calls may include function calls normally made to the underlying operating system for such functions. These function calls may also include function calls for additional functions performed specifically by the virtual machine. These function calls may be transparently intercepted by the virtual machine so that the client applications can continue to use the native function calls exposed by the underlying operating system.

The virtual machine interpreter may also provide a function 123 to securely update the set of virtual machine codes from a trusted party 122. The codes may be signed by the trusted party and verified by the virtual machine before the updating process is allowed to replace the set of virtual machine codes used by the virtual machine. The virtual machine interpreter may provide secure access 103 to functions 102 in the underlying operating system. This access may be protected by the use of techniques to detect when the functions have been modified or moved by an external observer. These techniques may include an anti-hooking technique, which may include a check that the function address has not been changed. These techniques may include an analysis of the time taken for the function to return a result, which may include a check that the function does not take longer than a certain amount of time to return a result. These techniques may additionally include a technique to vary the execution path so that an attacker cannot easily spoof the time taken, as the time taken will vary with each execution. This technique may involve executing a random number of instructions within the virtual machine in between checking the system time such that the length of the execution path will vary with each execution and the time taken will also vary with each execution. This technique may also involve executing different types of instructions within the virtual machine, with the time taken for each type of instruction known to the virtual machine codes, such that the execution path will incorporate different instructions each execution and the time taken will vary with each execution.

The tamper-proof virtual layer 110 may protect the virtual machine from reverse engineering by storing the set of virtual machine codes in an encrypted form, and decrypting these instructions at runtime to allow normal operation of the virtual machine. The encryption and decryption may be achieved through self-modifying virtual machine codes. The virtual machine interpreter may decrypt these self-modifying virtual machine codes by executing them within the virtual machine. There may be more than one round of self-modification performed by the virtual machine codes to further delay attempts at reverse engineering. There may be different cryptographic data and algorithms used at each round of self-modification. The self-modifying codes may involve different decryption routines with stored decryption keys, which decrypt a block of code from an encrypted form back into the plaintext form, before passing execution control to the decrypted codes. The self-modifying codes may also involve replacing sets of instruction sequences with other sets of instruction sequences that achieve the same execution result.

The tamper-proof virtual layer may protect the virtual machine from runtime analysis by employing techniques 116 to prevent debugging of the virtual machine. These techniques may include a technique to prevent a debugger from, being attached to the virtual machine. These techniques may include a technique to detect when the use of a debugger is being attempted through the use of self-debugging calls. These techniques may include a technique to redirect execution of the virtual machine when a debugger is used by exploiting differences in processor execution under a debugger. The tamper-proof virtual layer may detect tampering of the virtual machine through the use of multiple layers of security within the virtual machine code. These layers may include a layer with additional tamper checks within the virtual machine. These tamper checks may include a check of unique device identifiers to ensure that the virtual machine has not been copied to an unauthorized machine. These tamper checks may include a check of the native operating environment functions to ensure that these functions have not been modified. These tamper checks may include a check of the operating environment to ensure that the environment has not been modified. These tamper checks may include a check of the application memory to ensure that the application has not been modified. The tamper-proof virtual layer may provide a function to respond to tampering of the virtual machine. This function may include the zeroing of information within the virtual machine. This function may include the processing of a different set of cryptographic data or algorithms.

The tamper-proof virtual layer may intersperse the techniques for protecting against reverse engineering and the techniques for protecting against runtime analysis so as to render either form of analysis ineffective. This may include a technique to intersperse the techniques for runtime analysis with techniques for reverse engineering that require time-consuming manual reverse engineering for an attacker to bypass. This may include a technique to separate the techniques for reverse engineering with techniques for runtime analysis that prevent automated runtime analysis. This may include a technique to repeat these techniques multiple times within the tamper-proof virtual layer such that the total analysis time required would be infeasible.

Figure 3:
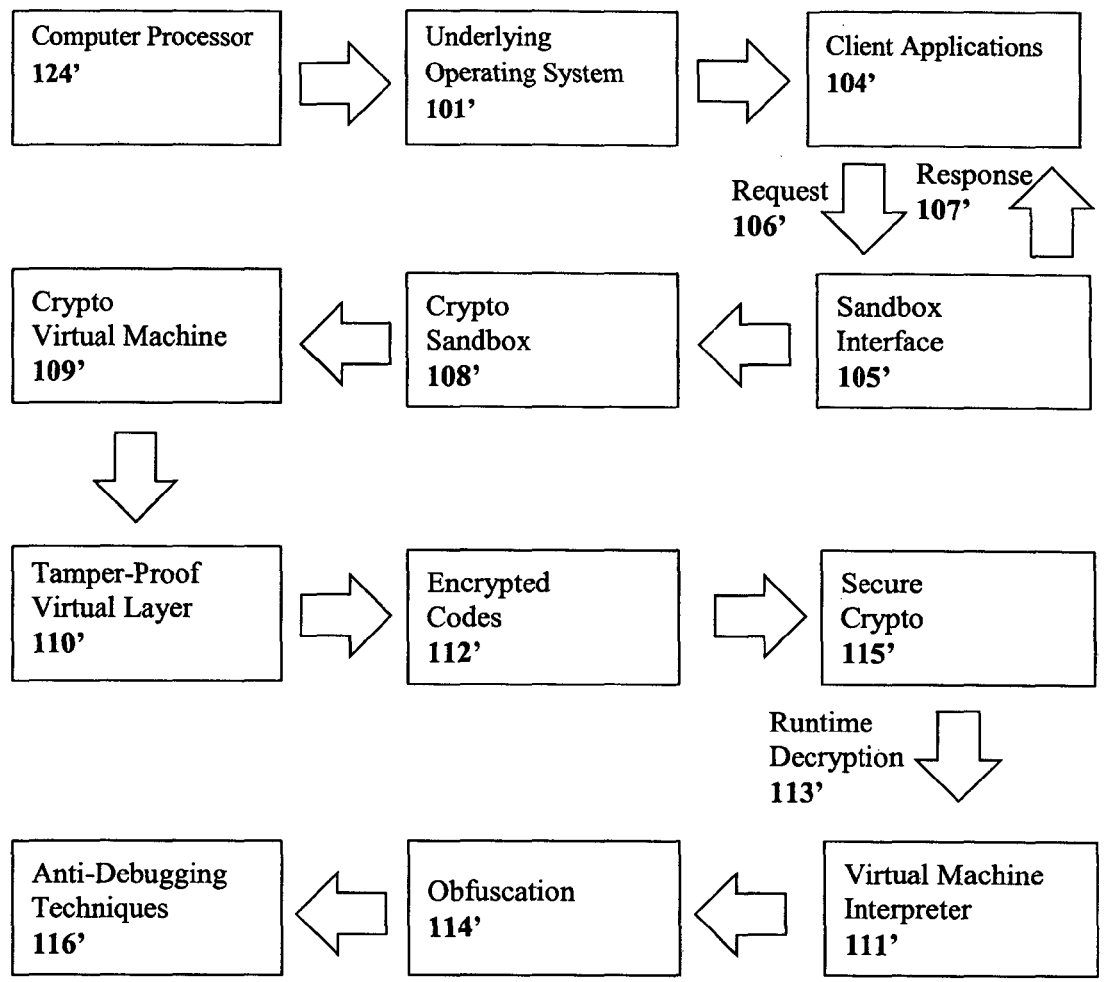
FIG. 3 illustrates a flow diagram of a start-up process of a cryptographic system in accordance with an embodiment of this invention.

FIG. 3 illustrates how this cryptographic system is started in accordance with an embodiment of the invention. The computer processor 124' starts the underlying operating system 101', which then executes the client applications 104'. The client applications can send requests 106' and receive responses 107' through a sandbox interface 105' that starts and provides access to the cryptographic sandbox 108'. Within the sandbox, the cryptographic virtual machine 109' is started when the application starts, which loads the tamper-proof virtual layer 110'. The virtual machine then loads the encrypted codes 112' which provide the secure cryptographic functions 115', and performs runtime decryption 113' using the virtual machine interpreter 111', which unwraps the obfuscation layer 114' in the encrypted codes. The codes then provide the anti-debugging techniques 116' to be executed in the virtual machine.

Figure 4:
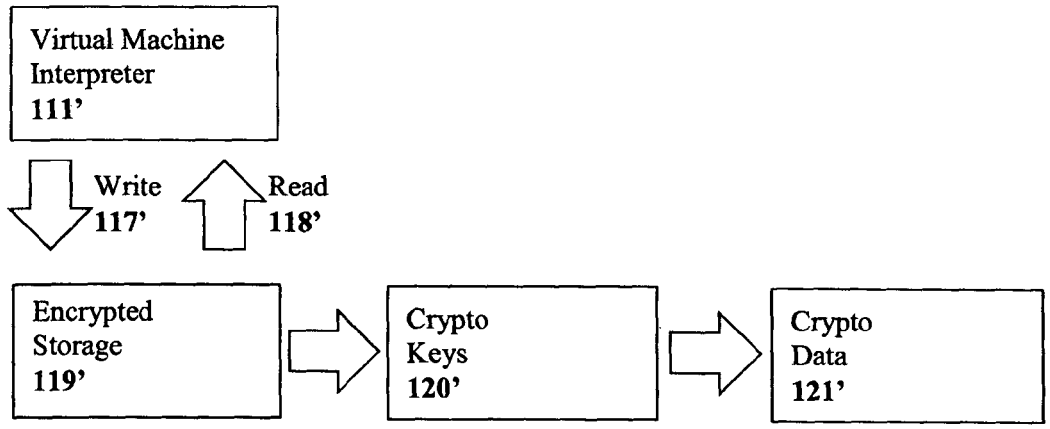
FIG. 4 illustrates a flow diagram of a process for accessing encrypted storage in accordance with an embodiment of this invention.

FIG. 4 illustrates how the cryptographic system accesses the encrypted storage in accordance with embodiment. The virtual machine interpreter 111', after starting up, performs encrypted writes 117' to and encrypted reads 118' from an encrypted storage 119'. The encrypted reads and encrypted writes may use an AES key stored in the encrypted codes. The information in the encrypted storage may comprise other cryptographic keys 120' or other cryptographic data 121'.

Figure 5:
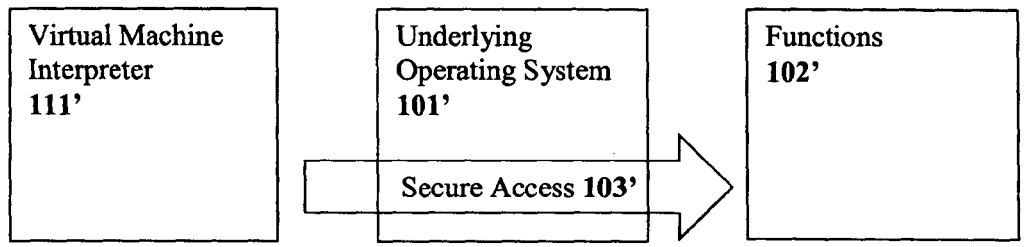
FIG. 5 illustrates a flow diagram of a process for trusted access of cryptographic system to operating system functions in accordance with an embodiment of this invention.

FIG. 5 illustrates how the cryptographic system has trusted access to operating system functions in accordance with an embodiment of this invention. The virtual machine interpreter 111', after starting up, verifies functions 102' from the underlying operating system 101' before calling these functions in order to ensure trusted access 103' to these functions is possible. This function verification may comprise function pointer checks.

Figure 6:
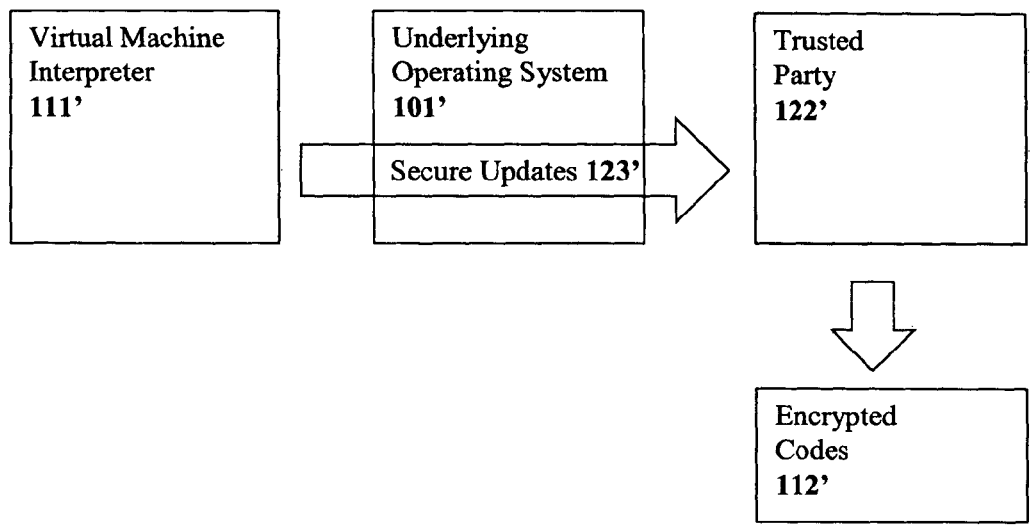
FIG. 6 illustrates a flow diagram of a process performed by the cryptographic system to securely check for updates in accordance with an embodiment of this invention.

FIG. 6 illustrates how the cryptographic system securely checks for updates in accordance with an embodiment of this invention. The virtual machine interpreter 111', after starting up, connects to a trusted party 112'. This connection may comprise a secure socket layer (SSL) connection. If the trusted party indicates that an update is available, the virtual machine interpreter will download a new set of encrypted codes 112' for use in the virtual machine.

The invention claimed is:

1. A product for providing cryptography to applications being performed on a device comprising:
   instructions for directing a processing unit to:
   provide a cryptographic sandbox that includes:
   a virtual cryptographic machine that performs cryptographic operations including decrypting virtual machine codes,
   a tamper-proof virtual layer within the cryptographic sandbox to protect cryptographic operations from unauthorized observers,
   a sandbox interface that receives requests for cryptographic operations from a client application and transmits results of the cryptographic operations performed by the virtual cryptographic machine to the client application; and
   a non-transitory media readable by the processing unit to store the instructions.

2. The product of claim 1 wherein the instructions for providing the cryptographic sandbox further comprise instructions for the cryptographic sandbox to include:
   a secure virtual storage for storing cryptographic keys and data.

3. The product of claim 1 wherein the secure virtual storage is within a memory space of the virtual cryptographic machine.

4. The product of claim 1 wherein the secure virtual storage is outside the virtual cryptographic machine.

5. The product of claim 1 wherein the instructions for providing a sandbox including a virtual cryptographic machine further comprise instructions to provide the virtual cryptographic machine with a virtual machine interpreter that obfuscates operation of the virtual cryptographic machine from an underlying operating system.

6. The product of claim 5 wherein the instructions for providing the virtual machine interpreter includes instructions for directing the processing unit to:
receive a function call from an underlying operating system in the machine interpreter,
verify the function call with the machine interpreter, and
perform the function call in the virtual cryptographic machine in response to the function call being verified.

7. The product of claim 1 wherein the instructions for providing the cryptographic sandbox further comprise instructions to provide the virtual cryptographic machine with a cryptographic module that performs the cryptographic operations.

8. The product of claim 1 wherein the instructions for providing the tamper proof layer include instructions that provide a set of virtual machine codes in an encrypted form that are decrypted at runtime to allow normal operation of the virtual cryptographic machine.

9. The product of claim 1 wherein the instructions for providing the cryptographic sandbox further comprise instructions for directing the processing unit to provide the virtual cryptographic machine with anti-debugging techniques to prevent debugging the virtual cryptographic machine.

10. The product of claim 1 wherein the instructions for providing the cryptographic sandbox further comprise instructions directing the processing unit to:
establish a secure connection to a trusted party,
determine whether an update is available, and
upload the update to memory.

11. A method for providing a virtual cryptographic sandbox for performing cryptographic operations in a device with a processing system comprising:

receiving a request to perform a cryptographic operation from an application in a sandbox interface performed by the processing system;
performing the cryptographic operation using a virtual cryptographic machine being performed by the processing system, the cryptographic operation including decrypting virtual machine codes,
providing a tamper proof layer within the virtual cryptographic machine that protects the cryptographic operations from unauthorized users, and
transmitting a result of the cryptographic operation using the sandbox interface.

12. The method of claim 11 further comprising:
storing encrypted keys and data and an encrypted storage, and
accessing the encrypted keys and data to perform the cryptographic operation.

13. The method of claim 12 wherein the encrypted storage is within a memory space of the virtual cryptographic machine.

14. The method of claim 12 wherein the encrypted storage is within a memory space of an underlying operating system.

15. The method of claim 11 further comprising:
obfuscating the operation of the virtual cryptographic machine from an underlying operating system.

16. The method of claim 15 further comprising:
receiving a function call from an underlying operating system in the machine interpreter,
verifying the function call with the machine interpreter, and
performing the function call in the virtual cryptographic machine in response to the function call being verified.

17. The method of claim 11 further comprising:
performing the cryptographic operations in a cryptographic module of virtual cryptographic machine.

18. The method of claim 11 further comprising:
providing the virtual cryptographic machine with anti-debugging techniques to prevent debugging the virtual cryptographic machine.

19. The method of claim 11 further comprising:
establishing a secure connection to a trusted party;
determining whether an update for the cryptographic sandbox is available; and
uploading the update to memory.

* * * * *